United States Patent
Zeller

Patent Number: 6,081,257
Date of Patent: Jun. 27, 2000

[54] CONTROL STICK ROTATABLY POSITIONABLE IN THREE AXES

[75] Inventor: Stegfried Zeller, Oberpframmern, Germany

[73] Assignee: Eurocopter Deutschland GmbH, Germany

[21] Appl. No.: 08/802,421

[22] Filed: Feb. 18, 1997

[30] Foreign Application Priority Data

Feb. 15, 1996 [DE] Germany ............... 196 05 573

[51] Int. Cl.$^7$ ............... H04B 10/00
[52] U.S. Cl. ............... 345/161; 74/471 XY; 356/139.03; 356/141.3; 356/141.5; 356/152.2
[58] Field of Search ............... 345/161; 74/471 XY; 244/17.13, 237; 356/139.03, 141.5, 152.2, 152.1

[56] References Cited

U.S. PATENT DOCUMENTS

| | | | |
|---|---|---|---|
| 3,432,240 | 3/1969 | Jackson | 356/152.2 |
| 3,432,671 | 3/1969 | Edmonds | 356/141.5 |
| 4,667,909 | 5/1987 | Curci | 74/471 X |
| 4,721,386 | 1/1988 | Collyer | 356/139.03 |
| 4,795,952 | 1/1989 | Brandstetter | 74/471 X |
| 5,076,517 | 12/1991 | Ferranti et al. | 74/471 X |
| 5,596,403 | 1/1997 | Schiff et al. | 356/139.03 |
| 5,798,828 | 8/1998 | Thomas et al. | 356/141.3 |
| 5,847,694 | 12/1998 | Redford et al. | 345/161 |

*Primary Examiner*—Jeffery A. Hofsass
*Assistant Examiner*—John Tweel, Jr.
*Attorney, Agent, or Firm*—Evenson, McKeown, Edwards & Lenahan, P.L.L.C.

[57] ABSTRACT

To determine the position of a control stick which can be adjusted in three axes, reliably and accurately in all three axes in a constructionally simple, compact and light-weight manner by means of a single sensor in an opto-electronic fashion, the sensor according to the invention contains a beam emitter which is fixedly connected with the control stick and emits at least two mutually spatially separate light beams. A stationary, light-sensitive detector mosaic situated along the whole adjusting range of the control stick in the beam path of both light beams, determines the position coordinates of the two light spots generated thereon by the light beams. An analyzing circuit determines the rolling, pitching and yawing position of the control stick from the position coordinates of the two light spots.

10 Claims, 2 Drawing Sheets

CONTROL STICK ROTATABLY POSITIONABLE IN THREE AXES

BACKGROUND AND SUMMARY OF THE INVENTION

This invention relates to a control stick, particularly for a helicopter, which can be rotatably positioned in three axes and has an electronic sensor for determining the control stick position.

It is known to use a non-contact inductive sensor arrangement to detect the rolling, pitching and yawing position of control sticks which can be adjusted in three axes. Such control sticks are used, for example, in fly-by-wire controlled blade angle adjusting systems of helicopters, and are usually equipped with an active stick force simulation. Such an arrangement is utilized in order to generate corresponding control commands for the blade angle adjustment and the stick force simulation. However, this arrangement requires a separate sensor and a separate signal processing for each control stick axis, so that the resulting sensor package requires undesirably high construction and weight expenditures and is difficult to accommodate under narrow installation conditions.

U.S. Pat. No. 3,432,671 discloses an opto-electronic position transmitter in which a rectangular light field is imaged by a deviation mirror which can be tilted in two axes, onto a sensor consisting of four photo cells arranged in a cross shape. The swivel position of the deviation mirror relative to the two axes of rotation is calculated, from the size of the illuminated surface parts. However, such a sensor is unsuitable for determining the position of a control stick, which can be adjusted in three axes. It also has the disadvantage of a limited measuring accuracy because external interfering influences, such as local fluctuations in the illumination intensity, distort the measuring result.

It is an object of the invention to provide a control stick of the initially mentioned type, which is constructionally simple, light weight and compact.

Another object is to provide such control stick which ensures extremely accurate and reliable measurement of the position of the control stick with respect to all three axes of movement.

According to the invention, this object is achieved by a special control stick sensor system having a double light beam which is swivelled in the same movement as the control stick. A detector surface, which is illuminated by the double beam along the whole adjusting range of the control stick, two-dimensionally scans the position of both light spots, and the control stick position is determined by signal analysis from the position coordinates of the two light spots.

The invention thus provides a constructionally simple, compact and light weight apparatus which uses a single sensor and an assigned electronic analyzing system to detect control stick movement according to size and direction, accurately and precisely in all three axes. The invention is therefore highly suitable for applications with strict weight limitations and narrow installation conditions, such as may exist, for example, in the helicopter construction.

In a further advantageous embodiment of the invention, one of the two light beams is aligned coaxially with respect to an axis of rotation of the control stick, so that a particularly simple, computation-related relationship is obtained between the position coordinates of the two light beam light spots on the detector mosaic and the rolling, pitching and yawing position of the control stick.

In order to save the light sensitive detector surface, the detector mosaic expediently consists of two detector fields which are separated from one another, and each of which is situated in the beam path of only one of the two light beams.

Moreover, for manufacturing reasons, the detector mosaic or the detector fields are preferably flat. The mutual position of the two light beams and optionally of the detector fields can be selected virtually arbitrarily according to the installation conditions. Thus, the two light beams may be inclined, and in particular may be aligned perpendicularly with respect to one another, which is recommended for a multiply redundant sensing system. However, generally, an essentially parallel mutual alignment of the two light beams is preferred.

In a constructionally particularly simple embodiment, the light beams are generated by two light-emitting diodes fastened to the control stick. However, it is also possible to provide a light-emitting single diode with a beam splitter arranged behind it to generate the double beam.

For sharp focussing of the light beams, focussed laser light may be used to form the light beams.

Other objects, advantages and novel features of the present invention will become apparent from the following detailed description of the invention when considered in conjunction with the accompanying drawings.

DETAILED DESCRIPTION OF THE DRAWINGS

Figure 1:
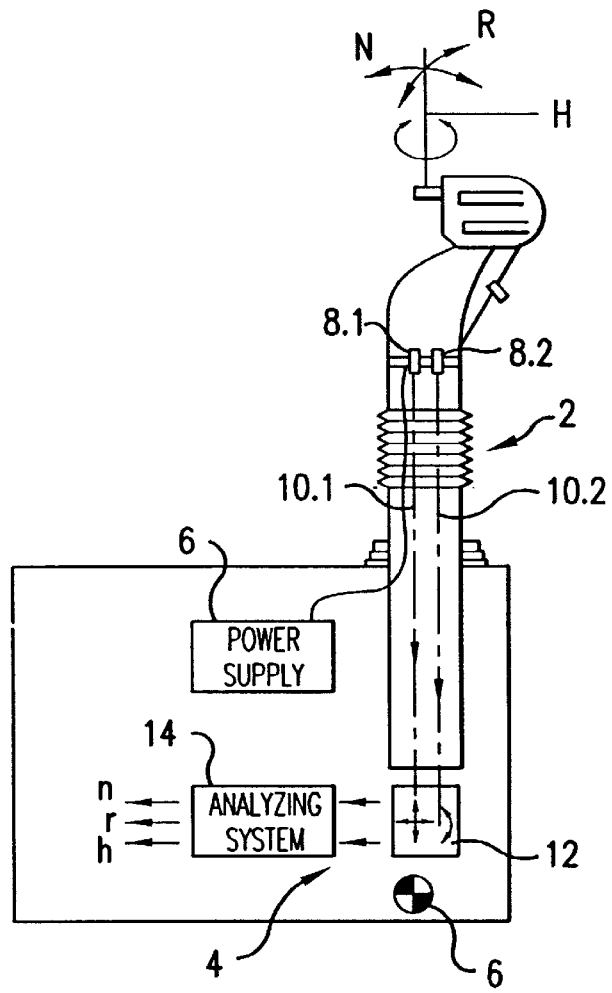
FIG. 1 is a schematic view of a control stick which can be adjusted in three axes and which has an assigned control stick sensor system according to the invention.

As shown in FIG. 1, a control stick 2 can be rotatably positioned to a limited degree in three axes, about a fictitious hinge point G. Specifically, the stick is rotatable about the vertical axis H and in the longitudinal and transverse control direction N and R, and contains an opto-electronic sensor which, as a whole, has the reference number 4. The sensor 4 measures the control stick positions in all three axes and supplies corresponding electric control commands n, r and h, for example, for a fly-by-wire controlled blade angle adjusting system of a helicopter connected behind, and for the stick force simulation of the control stick 2.

The sensor 4 contains two laser diodes 8.1 and 8.2 which are fastened in the interior thereof, and are connected to a power supply 6. The laser diodes 8.1, 8.2 include a focussing device (not shown) for generating two parallel, spatially mutually separate, sharply focussed laser light beams 10.1 and 10.2. One of the light beams 10.1 is aligned with the vertical axis H. (Instead of a pair of diodes, a single diode with a beam splitter arranged behind it can also be provided for generating the double beam 10.)

Below the control stick 2, a detector mosaic 12 (for example, a high-resolution, laser-light-sensitive CCD-detector) is fixed to the housing and situated in the beam path of the two light beams 10.1 and 10.2 along the whole adjusting range of the control stick 2. The detector mosaic 12 determines the position of these light spots $P_1$, $P_2$ generated on the detector surface and transmits the corresponding X- and Y-coordinates to an electronic analyzing system 14 where they are converted to the rolling, pitching and yawing commands r, n and h of the control stick 2, in the manner described below.

Figure 2:
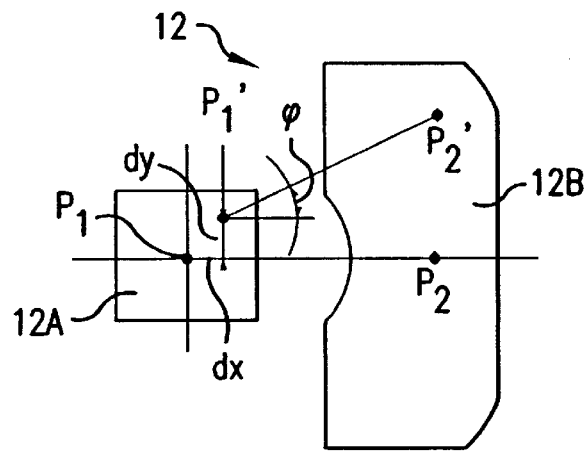
FIG. 2 is a schematic enlarged view of the light-sensitive detector mosaic according to FIG. 1.

At a zero position of the control stick 2, the light spot $P_1$ of the light beam 10.1 is situated at the origin of the coordinates and the light spot $P_2$ is situated on the X-axis of a two-dimensional reference system fixed to the detector. In FIG. 2, it is assumed that the control stick 2 is swivelled about each of its three axes, so that the light spot $P_1$ travels to point $P_1'$ and light spot $P_2$ travels to point $P_2'$. The changes of the light spot coordinates are digitally detected by the detector mosaic 12. In this case, the coordinate displacements dy and dx of the light spot $P_1$ are a direct measure of the rolling and pitching movement of the control stick 2 while the yaw angle $\phi$ about the vertical axis H is obtained from the X- and Y-coordinate difference of the light spots $P_1'$ and $P_2'$ according to the equation $\tan \phi = (y_2' - y_1')/(x_2' - x_1')$.

However, the light beams 10.1 and 10.2 may also have any other desired orientation with respect to one another and to the vertical axis H. To calibrate the sensor 2, it is necessary only to store the coordinates for the zero positions of the two light spots $P_1$ and $P_2$ in the zero position and in a second control stick position which is rotated with respect to the zero position only about the vertical axis H, in the electronic analyzing system 14. The above-indicated relationships between the measuring values of the detector mosaic 12 and the output signals n, r and h must of course also be modified in a corresponding manner.

In the interest of constructional simplicity, the detector mosaic 12 has a flat design. Thus, during a swivel movement of the control stick 2, the distance between the two light spots $P_1$ and $P_2$ changes slightly, which can be taken into account by corresponding correction factors filed, for example, in the form of tables in the electronic analyzing system 14. If the adjusting movements of the control stick 2 are smaller than the mutual distance of the light beams 10.1 and 10.2, the light spots $P_1$ and $P_2$ each remain in mutually separate surface areas. In order to save light-sensitive detector surface, the detector mosaic 12 can therefore be composed of two mutually separate detector fields 12A and 12B which correspond in form and size to the surface parts over which the light spots $P_1$ and $P_2$ travel, as shown in FIG. 2.

Figure 3:
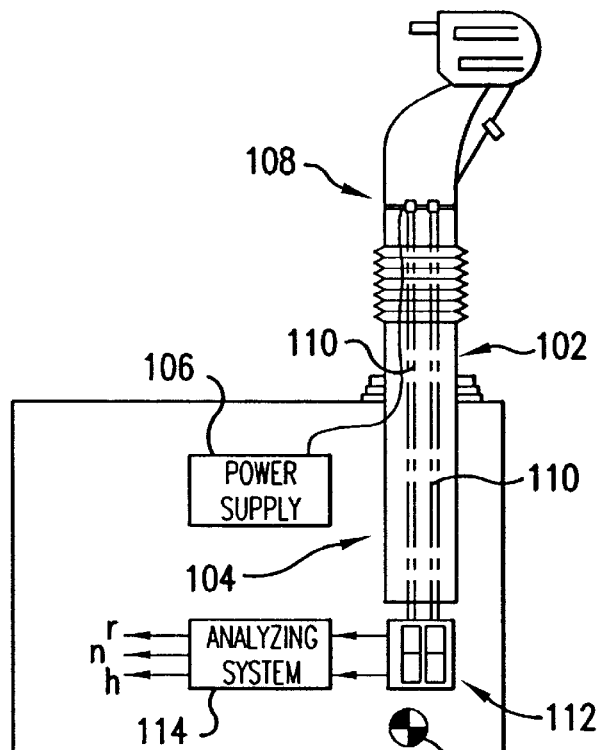
FIG. 3 is a schematic view of a second embodiment, with a multiply redundant control stick sensor system.

In FIG. 3, components corresponding to the first embodiment are designated by a reference number increased by 100. A control stick 102 is shown which has a multiply-redundant (specifically quad-redundant) sensor system 104. Correspondingly, a total of four double beams 110 are generated by a plurality of laser diodes 108, which double beams 110 each impinge on one of four detector mosaics 112 grouped about the vertical axis H of the control stick 102. The position coordinates of the pair of light spots in each case formed on the individual detector mosaics 112 are transmitted to a common electronic analyzing system 114 where the rolling, pitching and yawing position of the control stick 102 is, in turn, computed from them. The electronic analyzing system 114 is designed such that the sensor remains fully operable in the case of a failure of individual sensor components. The method of construction and operation is otherwise the same as in the case of the embodiment according to FIG. 1 and 2.

Figure 4:
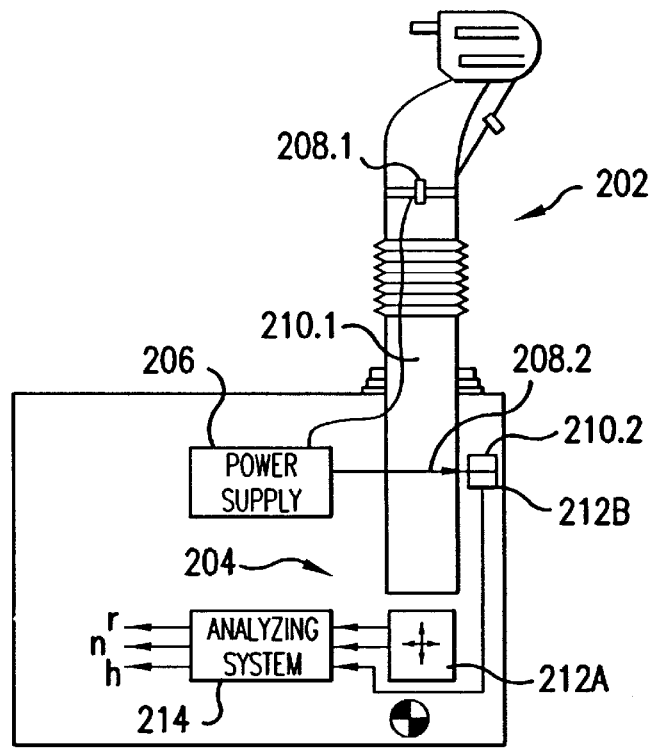
FIG. 4 is a schematic view of a modified embodiment of the control stick according to FIG. 1, with a mutually perpendicular light beam alignment.

The control stick 202 according to FIG. 4 (in which the individual components are designated by a reference number increased by 200), differs from the preceding embodiment by a different mutual orientation of the pair of light beams 210. While one light beam 210.1 emitted by the laser light diode 208.1 extends as before in the direction of the vertical axis of the control stick, the second light beam 210.2 generated by the laser light diode 208.2 is directed essentially radially to the control stick 202 to the detector field 212B which, is fixed laterally next to the control stick 202 on the housing. Alternatively, the detector field 212B may also be arranged in the same manner as in the first embodiment in the plane of the detector field 212A laterally next to it, and a diverting mirror can be provided instead of the detector field 212B which deviation mirror diverts the laterally directed laser light beam 210.2 downward to the detector field 212B. Taking into account the different beam guiding, the electronic analyzing system operates on the basis of correspondingly modified computing operations for converting the light spot position coordinates into position signals r, n and h of the control stick 202. Otherwise, the method of construction and operation is the same as in the case of the above-described embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control apparatus for navigational control of a helicopter having a control stick which can be rotatably positioned in three axes for generating control signals based on a spacial orientation thereof, and which has an opto-electronic sensor for determining the control stick position, said control apparatus comprising:

a beam emitter which is immovably connected with the control stick and emits two spatially separate light beams;

a stationary, light-sensitive detector mosaic situated along an entire adjusting range of the control stick in the beam path of both of said light beams, for determining position coordinates of two spacially separated light spots generated by said light beams on the detector mosaic; and an analyzing circuit for determining the rolling, pitching and yawing position of the control stick, as a function of the position coordinates of only said two light spots.

2. Control apparatus according to claim 1, wherein one of the two light beams is aligned with an axis of rotation of the control stick.

3. Control apparatus according to claim 1 wherein the detector mosaic comprises two separate detector fields, each situated in a beam path of one of the two light beams.

4. Control apparatus according to claim 3 wherein said detector fields are arranged in a common plane.

5. Control apparatus according to claim 3 wherein the two light beams are inclined to one another.

6. Control apparatus according to claim 3 wherein said two light beams are perpendicular to each other.

7. Control apparatus according to claim 1, wherein the two light beams are aligned in parallel to one another.

8. Control apparatus according to claim 1 wherein said beam emitter comprises two light-emitting diodes fastened to the control stick.

9. Control apparatus according to claim 1 wherein said beam emitter comprises a light-emitting single diode and a beam splitter arranged behind it.

10. Control apparatus according to claim 1 wherein the beam emitter is a laser beam emitter.

* * * * *